United States Patent
Hayashi

(10) Patent No.: US 11,450,858 B2
(45) Date of Patent: Sep. 20, 2022

(54) NON-AQUEOUS ELECTROLYTE SECONDARY BATTERY HAVING AN IMPROVED INSULATING LAYER

(71) Applicant: TOYOTA JIDOSHA KABUSHIKI KAISHA, Toyota (JP)

(72) Inventor: Kunihiko Hayashi, Anjo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 245 days.

(21) Appl. No.: 16/887,005

(22) Filed: May 29, 2020

(65) Prior Publication Data
US 2020/0388856 A1 Dec. 10, 2020

(30) Foreign Application Priority Data
Jun. 6, 2019 (JP) .............................. JP2019-106457

(51) Int. Cl.
*H01M 4/66* (2006.01)
*H01M 10/0525* (2010.01)
*H01M 4/02* (2006.01)

(52) U.S. Cl.
CPC ....... *H01M 4/668* (2013.01); *H01M 10/0525* (2013.01); *H01M 2004/027* (2013.01); *H01M 2004/028* (2013.01)

(58) Field of Classification Search
CPC ............. H01M 4/668; H01M 10/0525; H01M 2004/027; H01M 2004/028; H01M 4/64;
(Continued)

(56) References Cited

U.S. PATENT DOCUMENTS

2012/0058375 A1 3/2012 Tanaka et al.
2014/0011064 A1 1/2014 Matsuda et al.
(Continued)

FOREIGN PATENT DOCUMENTS

JP 2012074359 A 4/2012
JP 2017143004 A 8/2017
(Continued)

*Primary Examiner* — Gary D Harris
(74) *Attorney, Agent, or Firm* — Dickinson Wright, PLLC

(57) ABSTRACT

Provided is a non-aqueous electrolyte secondary battery in which an increase in temperature, which is caused by a short circuit at an exposed part of an interface between a positive electrode current collector and an insulating layer provided on the positive electrode current collector, is suppressed. The non-aqueous electrolyte secondary battery disclosed here includes a positive electrode, a negative electrode and a non-aqueous electrolyte. The positive electrode includes a positive electrode current collector, a positive electrode active substance layer and an insulating layer. The positive electrode current collector has a part where the positive electrode current collector is exposed at at least one edge thereof. The insulating layer is positioned at a boundary between the positive electrode active substance layer and the part where the positive electrode current collector is exposed. The insulating layer contains an inorganic filler and resin particles at a mass ratio of 75:25 to 25:75. The compressive strength of the resin particles is 74 MPa or less.

4 Claims, 4 Drawing Sheets

(58) Field of Classification Search
CPC ...... H01M 50/531; H01M 4/13; H01M 4/628; H01M 50/572; H01M 10/052; H01M 10/0587; H01M 10/4235; Y02E 60/10; Y02P 70/50
USPC .......................................................... 429/11
See application file for complete search history.

(56) References Cited

U.S. PATENT DOCUMENTS

| | | | |
|---|---|---|---|
| 2016/0133934 A1 | 5/2016 | Tode et al. | |
| 2019/0372150 A1* | 12/2019 | Busacca | H01M 10/0525 |
| 2020/0203724 A1* | 6/2020 | Hagiwara | C01G 53/50 |

FOREIGN PATENT DOCUMENTS

| | | |
|---|---|---|
| JP | 2017208365 A | 11/2017 |
| JP | 2018014194 A | 1/2018 |
| WO | 2012128160 A1 | 9/2012 |
| WO | 2018/093965 A1 | 5/2018 |

* cited by examiner

NON-AQUEOUS ELECTROLYTE SECONDARY BATTERY HAVING AN IMPROVED INSULATING LAYER

BACKGROUND OF THE INVENTION

1. Field of the Invention

The present disclosure relates to a non-aqueous electrolyte secondary battery. This application claims the benefit of foreign priority to Japanese Patent Application No. 2019-106457, filed on Jun. 6, 2019, which is herein incorporated by reference in its entirety.

2. Description of the Related Art

In recent years, non-aqueous electrolyte secondary batteries such as lithium ion secondary batteries have been advantageously used as portable power sources for personal computers, mobile devices, and the like, and as motive power sources for vehicles such as electric vehicles (EV), hybrid vehicles (HV) and plug-in hybrid vehicles (PHV).

Positive electrodes of non-aqueous electrolyte secondary batteries generally have a configuration in which a positive electrode active substance layer is provided on a positive electrode current collector. In addition, for purposes of current collection, positive electrodes generally have a part where a positive electrode active substance layer is not provided and a positive electrode current collector is exposed. Providing an insulating layer at a boundary between a positive electrode active substance layer and a part where a positive electrode current collector is exposed is known as a technique for preventing a short circuit between a positive electrode and a negative electrode (for example, see Japanese Patent Application Publication No. 2017-143004).

SUMMARY OF THE INVENTION

However, as a result of diligent research, the inventors of the present disclosure found the following:

As a non-aqueous electrolyte secondary battery is charged and discharged, a positive electrode active substance undergoes expansion and contraction. As a result, stress occurs at an interface between a positive electrode active substance layer and an insulating layer, and this stress is propagated to an interface between the insulating layer and a positive electrode current collector. As charging and discharging are repeated, stress repeatedly occurs, which leads to a decrease in peel strength between the insulating layer and the positive electrode current collector. As a result, when a deforming force is applied from outside the non-aqueous electrolyte secondary battery, the interface between the insulating layer and the positive electrode current collector easily becomes exposed. If a short circuit occurs as a result of contamination by a foreign matter or the like at the exposed part of this interface, the problem of a significant temperature increase occurs.

Therefore, the purpose of the present disclosure is to provide a non-aqueous electrolyte secondary battery in which an increase in temperature, which is caused by a short circuit at an exposed part of an interface between a positive electrode current collector and an insulating layer provided on the positive electrode current collector, is suppressed.

The non-aqueous electrolyte secondary battery disclosed here includes a positive electrode, a negative electrode and a non-aqueous electrolyte. The positive electrode includes a positive electrode current collector, a positive electrode active substance layer and an insulating layer. The positive electrode current collector has a part where the positive electrode current collector is exposed at at least one edge thereof. The insulating layer is positioned at a boundary between the positive electrode active substance layer and the part where the positive electrode current collector is exposed. The insulating layer contains an inorganic filler and resin particles at a mass ratio of 75:25 to 25:75. The resin particles has a compressive strength of 74 MPa or less.

Provided by such a configuration is a non-aqueous electrolyte secondary battery in which an increase in temperature, which is caused by a short circuit at an exposed part of an interface between the positive electrode current collector and the insulating layer provided on the positive electrode current collector, is suppressed.

In a desired aspect of the non-aqueous electrolyte secondary battery disclosed here, the resin particles are at least one type of particle selected from the group consisting of polyethylene particles, polytetrafluoroethylene particles and polyvinylidene fluoride particles.

According to such a configuration, it is possible to effectively suppress the above-mentioned temperature increase caused by the short circuit.

In a desired aspect of the non-aqueous electrolyte secondary battery disclosed here, the compressive strength of the resin particles is 25 MPa or less.

According to such a configuration, it is possible to better suppress the above-mentioned temperature increase caused by the short circuit.

In a desired aspect of the non-aqueous electrolyte secondary battery disclosed here, the compressive strength of the resin particles is 15 MPa or less.

According to such a configuration, it is possible to further suppress the above-mentioned temperature increase caused by the short circuit.

DESCRIPTION OF THE PREFERRED EMBODIMENTS

Embodiments of the present disclosure will now be explained. Matters which are essential for carrying out the disclosure and which are matters other than those explicitly mentioned in this specification (for example, ordinary features and production processes of the non-aqueous electrolyte secondary battery that do not characterize the present disclosure) are matters that a person skilled in the art could understand to be matters of design on the basis of the prior art in this technical field. The present disclosure can be carried out on the basis of the matters disclosed herein and common general technical knowledge in this technical field.

The term "secondary battery" herein means electricity storage devices in general that can be repeatedly charged and discharged, and is a term that encompasses so-called storage batteries and electricity storage elements such as electrical double layer capacitors.

In addition, the term "lithium ion secondary battery" herein means a secondary battery in which lithium ions are used as charge carriers and charging and discharging are effected by means of charge transfer involving lithium ions between positive and negative electrodes.

The present disclosure will now be explained in detail using a flat square lithium ion secondary battery as an example, but the present disclosure is in no way limited to the battery described in this embodiment.

Figure 1:
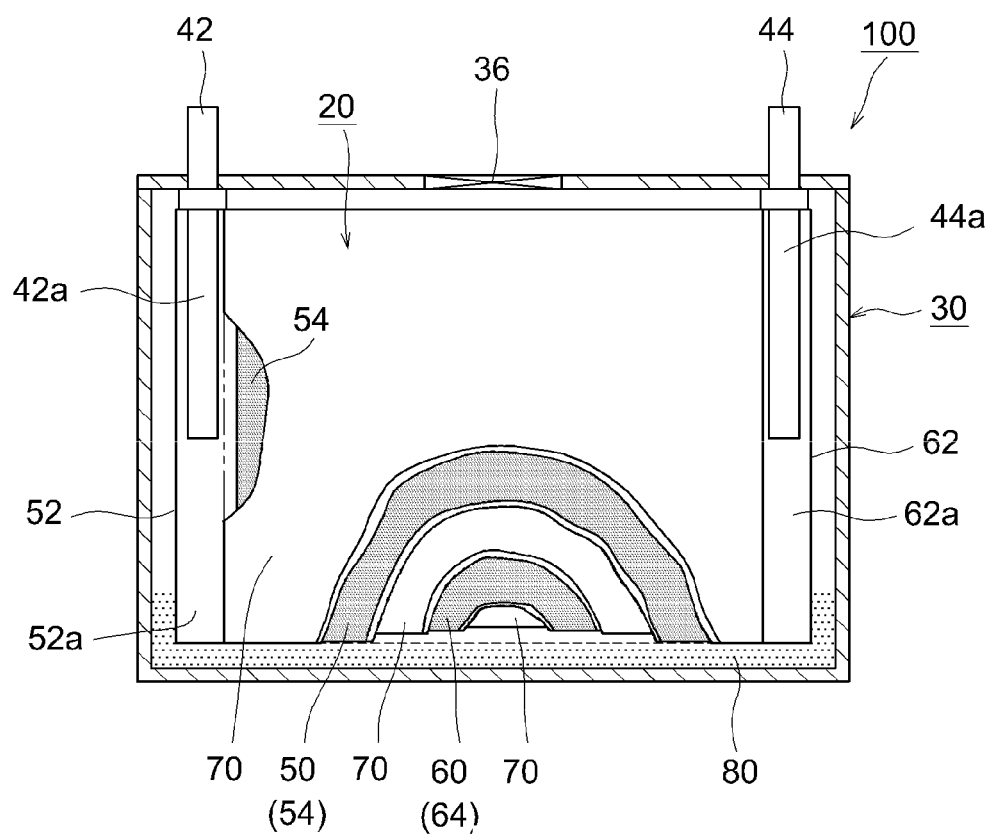
FIG. 1 is a cross-sectional view that schematically illustrates the internal structure of a lithium ion secondary battery according to one embodiment of the present disclosure.

A lithium ion secondary battery 100 shown in FIG. 1 is a sealed battery constructed by housing a flat wound electrode body 20 and a non-aqueous electrolyte 80 in a flat square battery case (that is, an outer container) 30. The battery case 30 is provided with a positive electrode terminal 42 and negative electrode terminal 44 for external connections, and a thin-walled safety valve 36, which is set to release the pressure inside the battery case 30 when this pressure reaches or exceeds a prescribed level. In addition, the battery case 30 is provided with an injection port (not shown) for injecting the non-aqueous electrolyte 80. The positive electrode terminal 42 is electrically connected to a positive electrode current collector plate 42a. The negative electrode terminal 44 is electrically connected to a negative electrode current collector plate 44a. A metallic material which is lightweight and exhibits good thermal conductivity, such as aluminum, can be used as the constituent material of the battery case 30.

Figure 2:
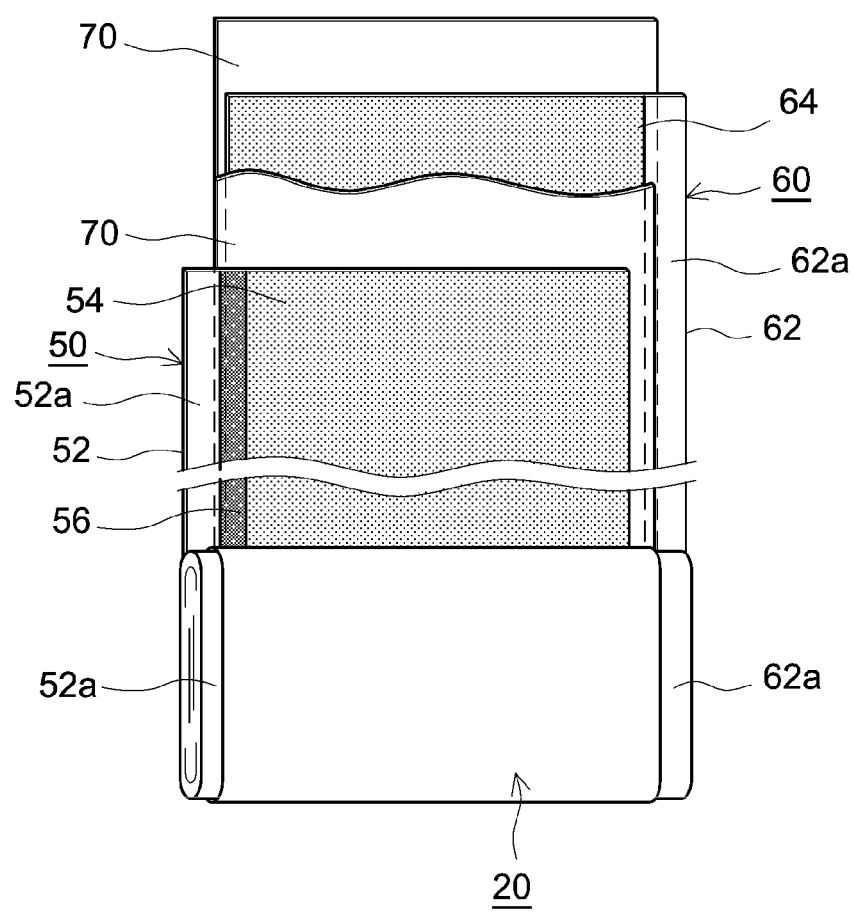
FIG. 2 is a schematic diagram that illustrates a configuration of a wound electrode body of a lithium ion secondary battery according to one embodiment of the present disclosure.

As shown in FIG. 1 and FIG. 2, the wound electrode body 20 is formed into a flat shape by overlaying a long strip-shaped positive electrode sheet 50 and a long strip-shaped negative electrode sheet 60, with two long strip-shaped separator sheets 70 interposed therebetween, and then winding this overlaid article in the longitudinal direction.

Figure 3:
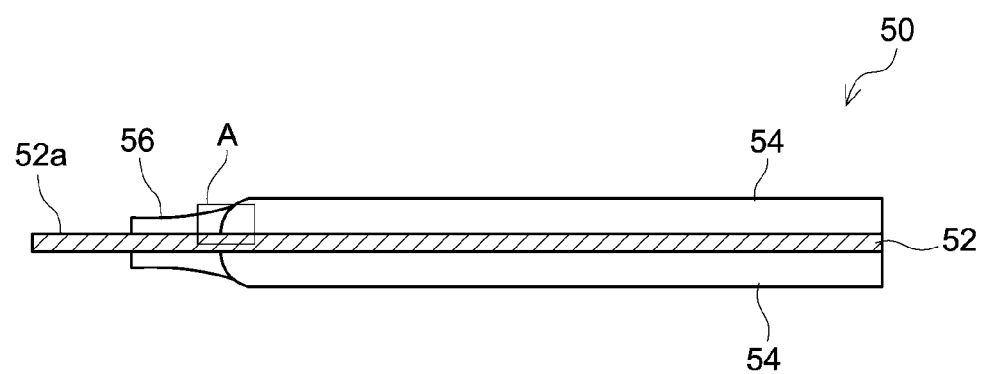
FIG. 3 is a schematic cross-sectional view that illustrates an example of a positive electrode for a lithium ion secondary battery according to one embodiment of the present disclosure.

As shown in FIG. 2 and FIG. 3, the positive electrode sheet 50 has a long strip-shaped positive electrode current collector 52 and a positive electrode active substance layer 54 formed on the positive electrode current collector 52. The positive electrode active substance layer 54 is provided on both surfaces of the positive electrode current collector 52 in the illustrated example, but may be provided on only one surface of the positive electrode current collector. In addition, the positive electrode current collector 52 has a part 52a where the positive electrode active substance layer 54 is not formed and the positive electrode current collector 52 is exposed (a positive electrode current collector exposed part). As shown in FIG. 2, the positive electrode current collector exposed part 52a is formed so as to protrude outwards from one edge in the winding axis direction of the wound electrode body 20 (that is to say, the sheet width direction that is perpendicular to the longitudinal direction). In addition, the positive electrode sheet 50 is provided with an insulating layer 56 formed on the positive electrode current collector 52. The insulating layer 56 is adjacent to the positive electrode active substance layer 54, and is positioned between the positive electrode active substance layer 54 and the positive electrode current collector exposed part 52a in the plane direction of the positive electrode sheet 50. In other words, the insulating layer 56 is positioned at the boundary between the positive electrode active substance layer 54 and the positive electrode current collector exposed part 52a. The insulating layer 56 is provided on both surfaces of the positive electrode current collector 52 in the illustrated example, but may be provided on only one surface of the positive electrode current collector 52. As shown in FIG. 2, the positive electrode current collector sheet 42a is joined to the positive electrode current collector exposed part 52a.

An aluminum foil can be given as an example of the positive electrode current collector 52 that constitutes the positive electrode sheet 50.

The positive electrode active substance layer 54 contains a positive electrode active substance. Lithium-transition metal oxides (for example, $LiNi_{1/3}Co_{1/3}Mn_{1/3}O_2$, $LiNiO_2$, $LiCoO_2$, $LiFeO_2$, $LiMn_2O_4$, $LiNi_{0.5}Mn_{1.5}O_4$, and the like) and lithium-transition metal phosphate compounds (for example, $LiFePO_4$ and the like) can be given as examples of the positive electrode active substance. The positive electrode active substance layer 54 can contain components other than the active substance, such as an electrically conductive material, a binder and a lithium phosphate. Carbon black such as acetylene black (AB) and other carbon materials (for example, graphite or the like) can be advantageously used as an electrically conductive material. For example, polyvinylidene fluoride (PVdF) or the like can be used as a binder.

Figure 4:
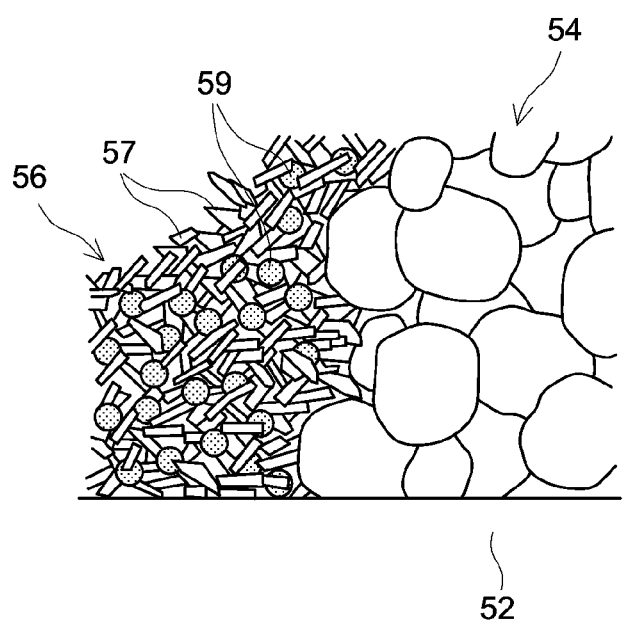
FIG. 4 is an enlarged view of the box A shown in FIG. 3.

As shown in FIG. 4, the insulating layer 56 contains an inorganic filler 57 and resin particles 59. The mass ratio of the inorganic filler 57 and the resin particles 59 (inorganic filler:resin particles) is 75:25 to 25:75.

The shape of the inorganic filler 57 is not particularly limited, and may be particulate, fibrous, plate-shaped, flake-shaped, or the like.

The average particle diameter of the inorganic filler 57 is not particularly limited, but is, for example, not less than 0.01 μm but not more than 10 μm, desirably not less than 0.1 μm but not more than 5 μm, and more desirably not less than 0.2 μm but not more than 2 μm. The average particle diameter of the inorganic filler 57 can be determined by, for example, a laser diffraction scattering method.

As the inorganic filler 57, the one having insulating properties is used, and specific examples thereof include inorganic oxides such as alumina ($Al_2O_3$), magnesia (MgO), silica ($SiO_2$) and titania ($TiO_2$); nitrides such as aluminum nitride and silicon nitride; metal hydroxides such as calcium hydroxide, magnesium hydroxide and aluminum hydroxide; clay minerals such as mica, talc, boehmite, zeolites, apatite and kaolin; and glass fibers, and it is possible to use one of these inorganic fillers alone or a combination of two or more types thereof. Of these, alumina, boehmite and magnesia are desired.

Particles having a compressive strength of 74 MPa or less can be used as the resin particles 59. From the perspective of further enhancing the advantageous effect of suppressing the above-mentioned increase in temperature caused by the short circuit, the compressive strength of the resin particles 59 is desirably 25 MPa or less, and more desirably 15 MPa or less. The compressive strength of the resin particles 59 can be determined as compressive strength (10% deformation) in accordance with JIS K 7181:2011.

The shape of the resin particles 59 is not particularly limited, and may be spherical or aspherical. From the perspective of being able to alleviate stress to a high degree, the resin particles 59 are desirably spherical or almost spherical particles having an aspect ratio of 1.2 or less.

The average particle diameter of the resin particles 59 is not particularly limited, but is, for example, not less than 0.01 μm but not more than 10 μm, desirably not less than 0.1 μm but not more than 6 μm, and more desirably not less than 1 μm but not more than 5 μm. The average particle diameter of the resin particles 59 can be determined by means of, for example, a call counter method.

The type of resin particle is not particularly limited as long as the compressive strength thereof falls within the range mentioned above. From the perspective of more effectively achieving the advantageous effect of suppressing the above-mentioned increase in temperature caused by the short circuit, the resin particles are desirably at least one type of particle selected from the group consisting of polyethylene (PE) particles, polytetrafluoroethylene (PTFE) particles and polyvinylidene fluoride (PVdF) particles, and are more desirably at least one type of particle selected from the group consisting of polyethylene (PE) particles and polytetrafluoroethylene (PTFE) particles.

The insulating layer 56 may further contain a binder. Examples of the binder include acrylic binders, styrene-butadiene rubbers (SBR) and polyolefin-based binders, and fluorine-based polymers such as polyvinylidene fluoride (PVdF) and polytetrafluoroethylene (PTFE) also can be used.

The content of the binder in the insulating layer 56 is not particularly limited, but is, for example, not less than 1 mass % but not more than 30 mass %, and desirably not less than 3 mass % but not more than 25 mass %.

According to the insulating layer 56 having a configuration such as that described above, it is possible to suppress an increase in temperature caused by a short circuit at an exposed part of the interface between the positive electrode current collector 52 and the insulating layer 56 provided on the positive electrode current collector 52. The reason for this is as follows.

As described above, as a lithium ion secondary battery is charged and discharged, a positive electrode active substance undergoes expansion and contraction. As a result, stress occurs at an interface between a positive electrode active substance layer and an insulating layer, and this stress is propagated to an interface between the insulating layer and a positive electrode current collector. As charging and discharging are repeated, stress repeatedly occurs, which leads to a decrease in peel strength between the insulating layer and the positive electrode current collector. As a result, when a deforming force is applied from outside the lithium ion secondary battery, the interface between the insulating layer and the positive electrode current collector easily becomes exposed. A significant temperature increase occurs if a short circuit occurs as a result of contamination by a foreign matter at the exposed part of this interface (and especially a short circuit between the negative electrode active substance layer and the positive electrode current collector).

In the present embodiment, however, the insulating layer 56 contains resin particles 59 having a compressive strength of 74 MPa or less. Resin particles 59 having a compressive stress that falls within such a range function as a cushioning material. In addition, if the inorganic filler 57 and the resin particles 59 are mixed at a mass ratio within the range 75:25 to 25:75, the insulating layer 56 functions appropriately as an insulating layer and also enables the function of the resin particles 59 as a cushioning material to be appropriately exhibited. Therefore, because the resin particles 59 function appropriately as a cushioning material, when the positive electrode active substance undergoes expansion and contraction as a result of charging and discharging, it is possible to alleviate stress that occurs at the interface between the positive electrode active substance layer 54 and the insulating layer 56 and at the interface between the insulating layer 56 and the positive electrode current collector 52, and it is possible to suppress a decrease in peel strength between the insulating layer 56 and the positive electrode current collector 52. As a result, exposure of the interface between the insulating layer 56 and the positive electrode current collector 52 is suppressed, and it is possible to prevent a short circuit and temperature increase caused thereby.

As shown in FIG. 2, the negative electrode sheet 60 has a long strip-shaped negative electrode current collector 62 and a negative electrode active substance layer 64 formed on the negative electrode current collector 62. The negative electrode active substance layer 64 is provided on both surfaces of the negative electrode current collector 62 in the illustrated example, but may be provided on only one surface of the negative electrode current collector 52. In addition, the negative electrode current collector 62 has a part 62a where the negative electrode active substance layer 64 is not formed and the negative electrode current collector 62 is exposed (a negative electrode current collector exposed part). The negative electrode current collector exposed part 62a is formed so as to protrude outwards from the other edge in the winding axis direction of the wound electrode body 20 (that is to say, the sheet width direction that is perpendicular to the longitudinal direction). The negative electrode current collector plate 44a is joined to the negative electrode current collector exposed part 62a.

For example, a copper foil or the like can be used as the negative electrode current collector 62 that constitutes the negative electrode sheet 60. For example, a carbon material such as graphite, hard carbon or soft carbon can be used as the negative electrode active substance contained in the negative electrode active substance layer 64. The negative electrode active substance layer 64 can contain components other than the active substance, such as a binder or a thickening agent. For example, a styrene-butadiene rubber (SBR) or the like can be used as a binder. For example, carboxymethyl cellulose (CMC) or the like can be used as a thickening agent.

Examples of the separator 70 include porous sheets (films) composed of resins such as polyethylene (PE), polypropylene (PP), polyesters, cellulose and polyamides. This type of porous sheet may have a single layer structure or a laminated structure having two or more layers (for example, a three-layer structure obtained by laminating a PP layer on both surfaces of a PE layer). A heat-resistant layer (HRL) may be provided on a surface of the separator 70.

In the present embodiment, a non-aqueous electrolyte solution is used as the non-aqueous electrolyte 80. The non-aqueous electrolyte 80 typically contains a non-aqueous solvent and a supporting electrolyte.

Organic solvents able to be used in electrolyte solutions of ordinary lithium ion secondary batteries, such as a variety of carbonates, ethers, esters, nitriles, sulfones and lactones, can be used without particular limitation as the non-aqueous solvent. Of these, carbonates are desired, and specific examples thereof include ethylene carbonate (EC), propylene carbonate (PC), diethyl carbonate (DEC), dimethyl carbonate (DMC), ethyl methyl carbonate (EMC), monofluoroethylene carbonate (MFEC), difluoroethylene carbonate (DFEC), monofluoromethyl difluoromethyl carbonate (F-DMC) and trifluorodimethyl carbonate (TFDMC). It is possible to use one such non-aqueous solvent in isolation or an appropriate combination of two or more types thereof.

Lithium salts such as $LiPF_6$, $LiBF_4$ and $LiClO_4$ (and desirably $LiPF_6$) can be used as the supporting electrolyte. The concentration of the supporting electrolyte is desirably 0.7 to 1.3 mol/L.

It should be noted that the non-aqueous electrolyte 80 may contain a variety of additives, such as gas generating agents such as biphenyl (BP) and cyclohexylbenzene (CHB); film-forming agents such as vinylene carbonate (VC) and oxalate complex compounds containing a boron atom and/or a phosphorus atom; dispersing agents; and thickening agents, as long as the advantageous effect of the present disclosure is not significantly impaired.

According to the lithium ion secondary battery 100 configured in the manner described above, it is possible to suppress an increase in temperature caused by a short circuit at an exposed part of the interface between the positive electrode current collector 52 and the insulating layer 56 provided on the positive electrode current collector 52.

The lithium ion secondary battery 100 can be used in a variety of applications. Examples of desired applications include motive power sources mounted in vehicles such as electric vehicles (EV), hybrid vehicles (HV) and plug in hybrid vehicles (PHV). The lithium ion secondary battery 100 can also be used in the form of a battery pack in which a plurality of batteries are typically connected in series and/or in parallel.

As one example, an explanation will be given of a square lithium ion secondary battery 100 provided with a flat wound electrode body 20. However, the lithium ion secondary battery can also be configured as a lithium secondary battery having a stacked-type electrode body. In addition, the lithium ion secondary battery can be configured as a cylindrical lithium ion secondary battery, a laminated-type lithium ion secondary battery, or the like. In addition, the features disclosed here can also be applied to non-aqueous electrolyte secondary batteries other than lithium ion secondary batteries.

Explanations will now be given of examples relating to the present disclosure, but it is not intended that the present disclosure is limited to these examples.

Production of Lithium Ion Secondary Battery

A paste was obtained by mixing acetylene black (AB) as an electrically conductive material, polyvinylidene fluoride (PVdF) and N-methyl-2-pyrrolidone (NMP) using a dispersing device. A positive electrode paste was obtained by introducing a mixed powder including $LiNi_{1/3}Co_{1/3}Mn_{1/3}O_2$ (LNCM) as a positive electrode active substance and $Li_3PO_4$ into this paste and then homogeneously dispersing the solid content. It should be noted that the positive electrode paste was prepared so that a mass ratio $LNCM:Li_3PO_4:AB:PVdF$ became 87:3:8:2.

A positive electrode active substance layer was formed by coating this positive electrode paste in a band-like shape on both surfaces of a long strip-shaped aluminum foil, drying and then pressing. The positive electrode paste was coated along one edge of the aluminum foil so as to form a current collector exposed part where the positive electrode active substance layer was not formed.

An insulating layer paste was prepared by mixing boehmite as an inorganic filler, poly(acrylic acid) as a binder, resin particles and water using a dispersing device. The resin particles shown in Table 1 were used. In addition, mixing was carried out so that the mass ratio of the inorganic filler, the binder and the resin particles was as shown in Table 1.

An insulating layer was formed by coating this insulating layer paste along a part of the current collector exposed part adjacent to the positive electrode active substance layer and then drying.

A positive electrode sheet of the type shown in FIG. 3 was produced in this way.

A negative electrode paste was prepared by mixing natural graphite (C) as a negative electrode active substance, a styrene butadiene rubber (SBR) as a binder and carboxymethyl cellulose (CMC) as a thickening agent with ion exchanged water at quantities whereby the C:SBR:CMC mass ratio was 98:1:1. A negative electrode sheet was produced by coating this negative electrode paste in a band-like shape on both surfaces of a long strip-shaped copper foil, drying, and then pressing.

A porous polyolefin sheet having a PP/PE/PP three-layer structure was prepared as a separator.

An electrode body was produced by laminating the positive electrode sheet, the separator sheet and the negative electrode sheet so that the separator was interposed between the positive electrode sheet and the negative electrode sheet. Here, Ni pieces were disposed between the insulating layer of the positive electrode sheet and the separator.

Next, terminals were attached to the electrode body, and the electrode body was housed in a laminated case.

Next, a non-aqueous electrolyte was poured into the laminated case, and the laminated case was hermetically sealed. A non-aqueous electrolyte obtained by dissolving $LiPF_6$ as a supporting electrolyte at a concentration of 1.0 mol/L in a mixed solvent containing ethylene carbonate (EC), and ethyl methyl carbonate (EMC) and dimethyl carbonate (DMC) at an EC:EMC:DMC volume ratio of 3:4:3 was used as the non-aqueous electrolyte.

A lithium ion secondary battery was produced in this way.

Evaluation of Lithium Ion Secondary Batteries

The lithium ion secondary batteries prepared in the manner described above were subjected to repeated pulsed charging and discharging. A temperature sensor was then attached to the laminated case. A short circuit was intentionally caused by applying a pressure via the laminated case to a part where Ni pieces were disposed. The temperature of the lithium ion secondary battery was monitored using the temperature sensor, and the difference between the maximum temperature reached and the temperature prior to the short circuit was determined. The results are shown in Table 1.

TABLE 1

| Test Example | Resin particles Type | Resin particles Compressive strength (MPa) | Constituent materials of insulating layer (mass %) Inorganic filler | Constituent materials of insulating layer (mass %) Binder | Constituent materials of insulating layer (mass %) Resin particles | Inorganic filler: resin particles (mass ratio) | Temperature increase (° C.) |
|---|---|---|---|---|---|---|---|
| 1 | PE | 25 | 80 | 20 | 0 | 100:0 | 32 |
| 2 | PE | 25 | 75 | 20 | 5 | 93.75:6.25 | 33 |
| 3 | PE | 25 | 70 | 20 | 10 | 87.5:12.5 | 31 |
| 4 | PE | 25 | 60 | 20 | 20 | 75:25 | 14 |
| 5 | PE | 25 | 40 | 20 | 40 | 50:50 | 15 |

TABLE 1-continued

| Test Example | Resin particles Type | Resin particles Compressive strength (MPa) | Constituent materials of insulating layer (mass %) Inorganic filler | Constituent materials of insulating layer (mass %) Binder | Constituent materials of insulating layer (mass %) Resin particles | Inorganic filler: resin particles (mass ratio) | Temperature increase (° C.) |
|---|---|---|---|---|---|---|---|
| 6 | PE | 25 | 20 | 20 | 60 | 25:75 | 12 |
| 7 | PE | 25 | 0 | 20 | 80 | 0:100 | 37 |
| 8 | PTFE | 15 | 40 | 20 | 40 | 50:50 | 12 |
| 9 | PVdF | 74 | 40 | 20 | 40 | 50:50 | 20 |

From the results in Table 1, it is understood that the temperature increase is slight in cases where the insulating layer contains an inorganic filler and resin particles at a mass ratio of 75:25 to 25:75 and the compressive strength of the resin particles is 74 MPa or less. In addition, by comparing Test Example 5, Test Example 8 and Test Example 9, it is understood that the temperature increase is lower in cases where the compressive strength of the resin particles is 25 MPa, and even lower in cases where the compressive strength of the resin particles is 15 MPa.

Therefore, it is understood that according to the non-aqueous electrolyte secondary battery disclosed here, it is possible to suppress an increase in temperature caused by a short circuit at an exposed part of an interface between the positive electrode current collector and the insulating layer provided on the positive electrode current collector. In addition, when the compressive strength of the resin particles is 25 MPa or less, a temperature increase is better suppressed, and when the compressive strength of the resin particles is 15 MPa or less, a temperature increase is further suppressed.

Specific examples of the present disclosure have been explained in detail above, but these are merely examples, and do not limit the scope of the claims. The features disclosed in the claims also encompass modes obtained by variously modifying or altering the specific examples shown above.

What is claimed is:

1. A non-aqueous electrolyte secondary battery, comprising:
   a positive electrode,
   a negative electrode, and
   a non-aqueous electrolyte, wherein
   the positive electrode includes a positive electrode current collector, a positive electrode active substance layer, and an insulating layer,
   the positive electrode current collector has a part where the positive electrode current collector is exposed at at least one edge thereof,
   the insulating layer is positioned at a boundary between the positive electrode active substance layer and the part where the positive electrode current collector is exposed,
   the insulating layer contains an inorganic filler and resin particles at a mass ratio of 75:25 to 25:75, and
   the resin particles have a compressive strength of 74 MPa or less.

2. The non-aqueous electrolyte secondary battery according to claim 1, wherein the resin particles are at least one type of particle selected from the group consisting of polyethylene particles, polytetrafluoroethylene particles and polyvinylidene fluoride particles.

3. The non-aqueous electrolyte secondary battery according to claim 1, wherein the compressive strength of the resin particles is 25 MPa or less.

4. The non-aqueous electrolyte secondary battery according to claim 1, wherein the compressive strength of the resin particles is 15 MPa or less.

* * * * *